(12) United States Patent
Eide

(10) Patent No.: US 7,367,418 B2
(45) Date of Patent: May 6, 2008

(54) SNOWMOBILE AIR BOX ASSEMBLY

(75) Inventor: Donn Eide, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 27 days.

(21) Appl. No.: 11/424,793

(22) Filed: Jun. 16, 2006

(65) Prior Publication Data

US 2007/0119650 A1 May 31, 2007

Related U.S. Application Data

(62) Division of application No. 10/290,844, filed on Nov. 7, 2002, now Pat. No. 7,100,730.

(51) Int. Cl.
*B62M 27/02* (2006.01)

(52) U.S. Cl. ........................................ 180/190; 180/186

(58) Field of Classification Search ................ 180/190, 180/9.5, 68.1, 68.4, 186, 68.3; 123/41.62, 123/184.22
See application file for complete search history.

(56) References Cited

U.S. PATENT DOCUMENTS

| 3,819,000 | A | | 6/1974 | Larsen |
| 3,966,014 | A | | 6/1976 | Gowing |
| 3,970,164 | A | * | 7/1976 | Suzuki ...................... 180/68.4 |
| 3,986,574 | A | * | 10/1976 | Irvine ......................... 180/68.1 |
| 4,008,777 | A | * | 2/1977 | Juto et al. ................... 180/182 |
| 4,146,101 | A | | 3/1979 | Plourde |
| 4,744,432 | A | * | 5/1988 | Shibata et al. ............. 180/68.1 |
| 5,117,932 | A | | 6/1992 | Kurosu et al. |
| 5,174,258 | A | | 12/1992 | Tanaka |
| 5,367,988 | A | | 11/1994 | Collins |
| 6,032,754 | A | * | 3/2000 | Izumi et al. ................ 180/190 |
| 6,152,100 | A | | 11/2000 | Shimizu |
| 6,796,395 | B1 | | 9/2004 | Berg et al. |
| 6,802,383 | B2 | | 10/2004 | Nishijma |
| 6,966,395 | B2 | | 11/2005 | Schuehmacher et al. |
| 7,040,426 | B1 | * | 5/2006 | Berg .......................... 180/9.5 |
| 7,100,730 | B2 | * | 9/2006 | Eide ........................... 180/190 |
| 2002/0084125 | A1 | | 7/2002 | Schuehmacher et al. |
| 2002/0100631 | A1 | | 8/2002 | Nishijma |
| 2004/0040768 | A1 | | 3/2004 | Yamamoto |

* cited by examiner

*Primary Examiner*—Hau Phan
(74) *Attorney, Agent, or Firm*—Black Lowe & Graham, PLLC

(57) ABSTRACT

The present invention is directed to an air box assembly for a snowmobile. The air box assembly is capable of being positioned frontward of the snowmobile engine, relative to a front end of the snowmobile. In this position, throttle noise being dampened by the air box assembly is further removed from an operator of the snowmobile sitting in an operator position on the snowmobile.

6 Claims, 6 Drawing Sheets

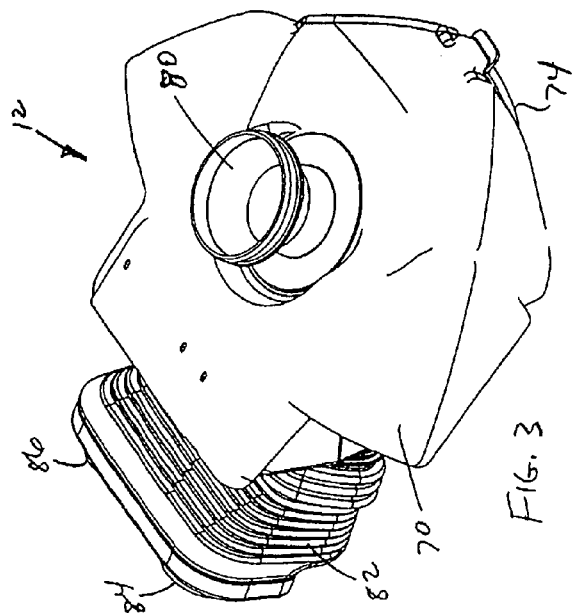
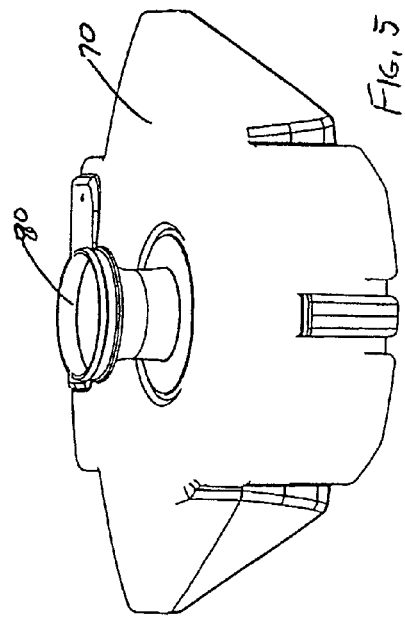
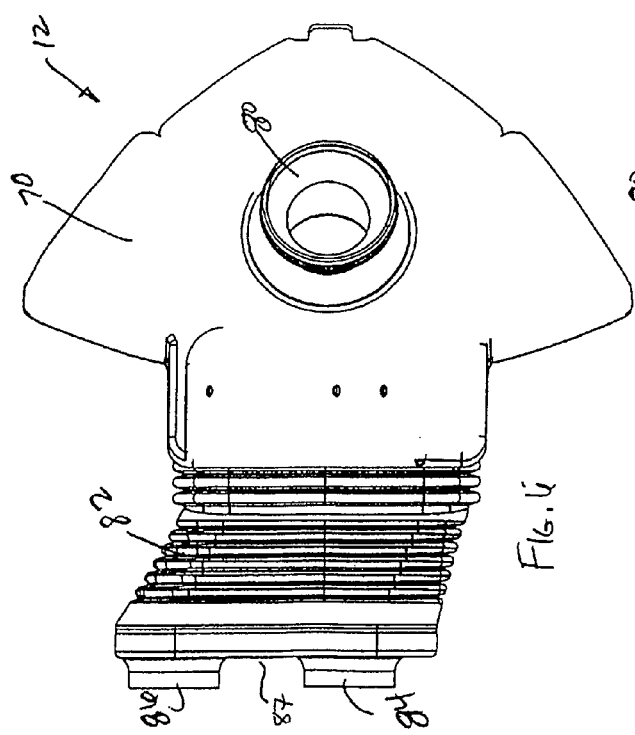
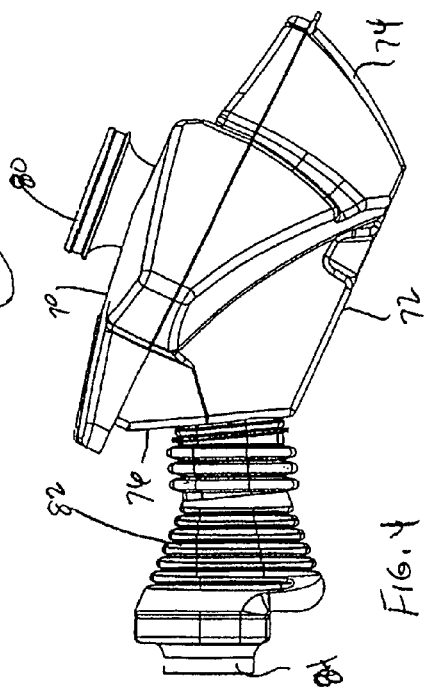

SNOWMOBILE AIR BOX ASSEMBLY

CROSS REFERENCE TO RELATED APPLICATIONS

This application constitutes a divisional of the commonly-owned U.S. patent application Ser. No. 10/290,844 entitled "SNOWMOBILE AIR BOX ASSEMBLY," filed on Nov. 7, 2002 now U.S. Pat. No. 7,100,730.

BACKGROUND OF THE INVENTION

1. Field of the Invention

The present invention relates to an air box assembly for a vehicle, and more specifically relates to an air box assembly for a snowmobile that includes air-silencing capabilities.

2. Related Art

Air box assemblies for snowmobiles have been in use for decades. Air box assemblies serve at least two purposes. First, the air box assembly provides an air intake to the throttle body assembly of the engine. Typically, the air box assembly filters incoming air from an air source as part of providing air intake to the throttle body assembly. Second, the air box assembly provides air-silencing capabilities by dampening throttle noise produced by the throttle body assembly that travels back to the air box assembly.

Known snowmobile air box assemblies are typically positioned rearward of the engine relative to a front end of the snowmobile. The air box assembly, in this rearward position, is also typically positioned frontward of the fuel tank of the snowmobile and adjacent the steering column. In this position, the air box assembly is just underneath and frontward of an operator sitting in an operator position of the snowmobile. Despite the noise dampening performed by an air box assembly in this position, the vehicle operator is typically exposed to a considerable amount of throttle noise due to the closeness of the air box assembly to the operator.

SUMMARY OF THE INVENTION

The present invention is directed to an air box assembly for a snowmobile. The air box assembly is capable of being positioned frontward of the snowmobile engine, relative to a front end of the snowmobile. In this position, throttle noise being dampened by the air box assembly is further removed from an operator of the snowmobile sitting in a driver position on the snowmobile.

In an alternative embodiment, an air box of the air box assembly includes a top portion in fluid communication with the snowmobile throttle body assembly, and a bottom portion that is capable of acting as a skid plate of the snowmobile. The bottom portion may be part of molded one piece structure that also forms a nose cone and bumper for the front of the snowmobile, and also may include a mount or hinge for the hood of the snowmobile.

BRIEF DESCRIPTION OF THE DRAWINGS

FIG. 3 is a perspective view of the air box assembly shown in FIG. 1;

FIG. 4 is a side view of the air box assembly shown in FIG. 1;

FIG. 5 is a front view of the air box assembly shown in FIG. 1;

FIG. 6 is a top view of the air box assembly shown in FIG. 1;

DETAILED DESCRIPTION OF THE PREFERRED EMBODIMENT

The present invention relates to an air box assembly for a snowmobile that is positioned frontward of the snowmobile engine, relative to a front end of the snowmobile. The air box assembly includes an air inlet in fluid communication with an air source and an air inlet/outlet port in fluid communication with a throttle body assembly of the snowmobile. In some embodiments, the air box assembly further includes a flexible tube having a first end secured to the air inlet/outlet port and a second end secured to the throttle body assembly to provide fluid communication there between.

Figure 1:
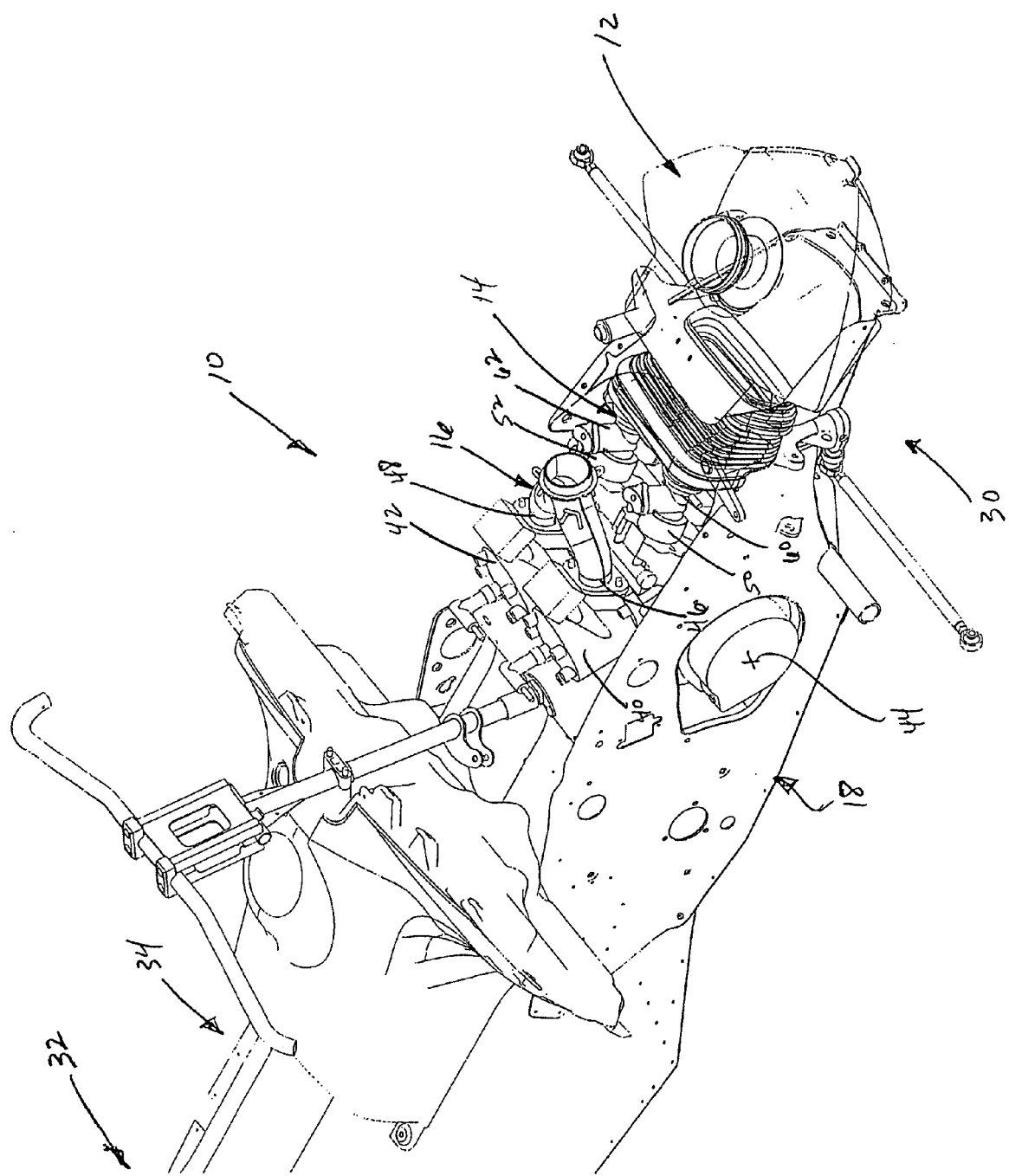
FIG. 1 is a perspective view of one example of an air box assembly of the present invention in fluid communication with an engine throttle body assembly and mounted to a snowmobile chassis.
Figure 2:
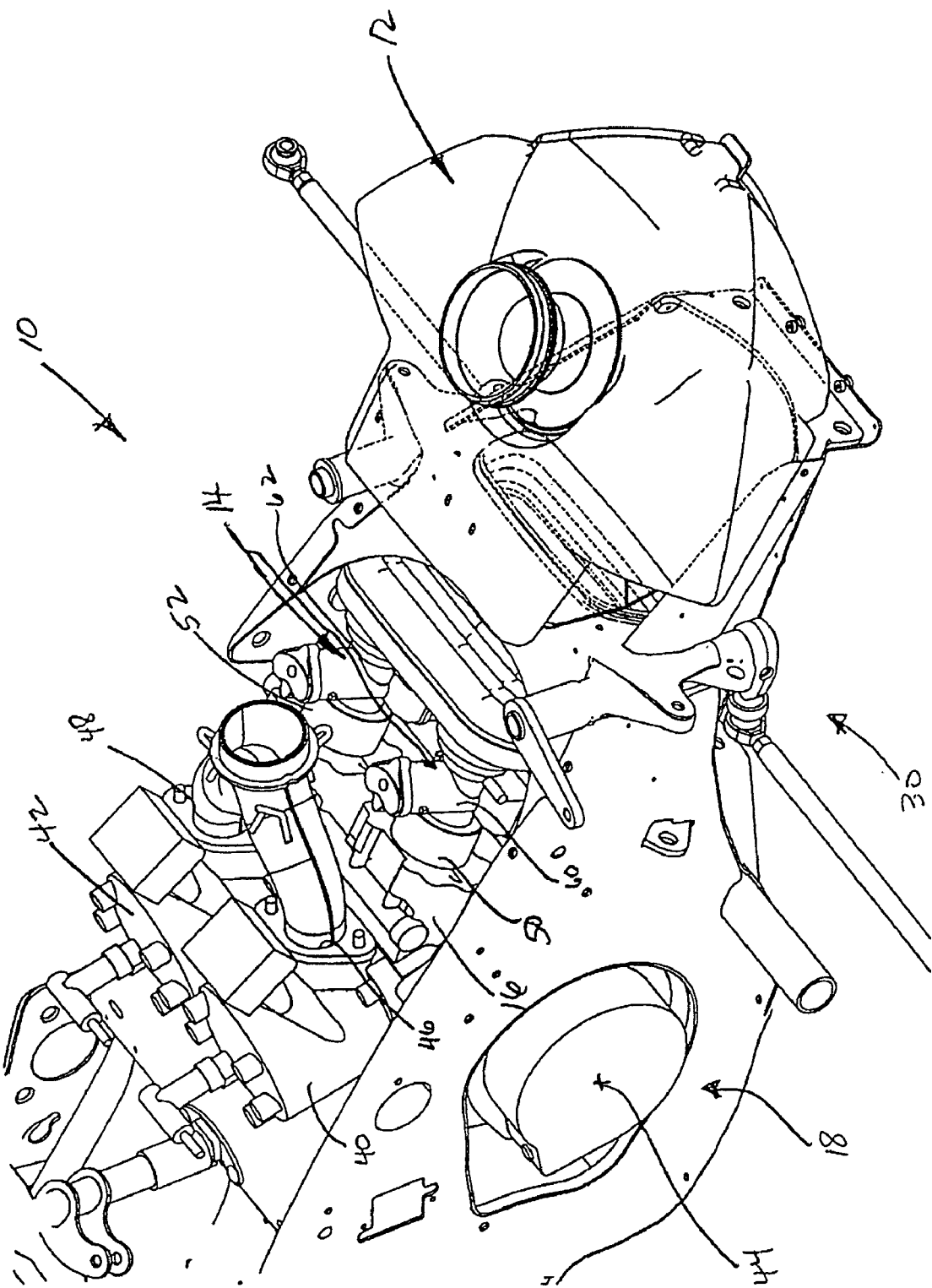
FIG. 2 is a close up view of the air box assembly mounting shown in FIG. 1.

FIGS. 1 and 2 illustrate a portion of a snowmobile assembly 10 that includes an air box assembly 12, a throttle body assembly 14, an engine 16, and a chassis 18. The chassis 18 includes a front portion 30, a rearward portion 32, and an operator position 34. The engine 16 is positioned in the chassis in a "lay down" orientation such that cylinders 40, 42 of the engine are angled relative to a vertical line that extends through a drive axis 44 of the engine. The engine includes exhaust ports 46, 48 and air inlets 50, 52. The throttle body assembly 14 includes first and second portions 60, 62 that are secured to the air inlets 50, 52, respectively, to provide fluid communication there between.

Air box assembly 12 is shown in further detail in FIGS. 3-6, and includes a top side 70, a bottom side 72, a front side 74, and a rear side 76. Air box assembly 12 also includes an air inlet 80, and a flexible air channel 82 extending from the rear side 76 to air outlets 84, 86. Air outlets 84, 86 are secured to the first and second portions 60, 62 of throttle body assembly 14 to create fluid communication between air box 12, throttle body 14, and engine 16.

Figure 7:
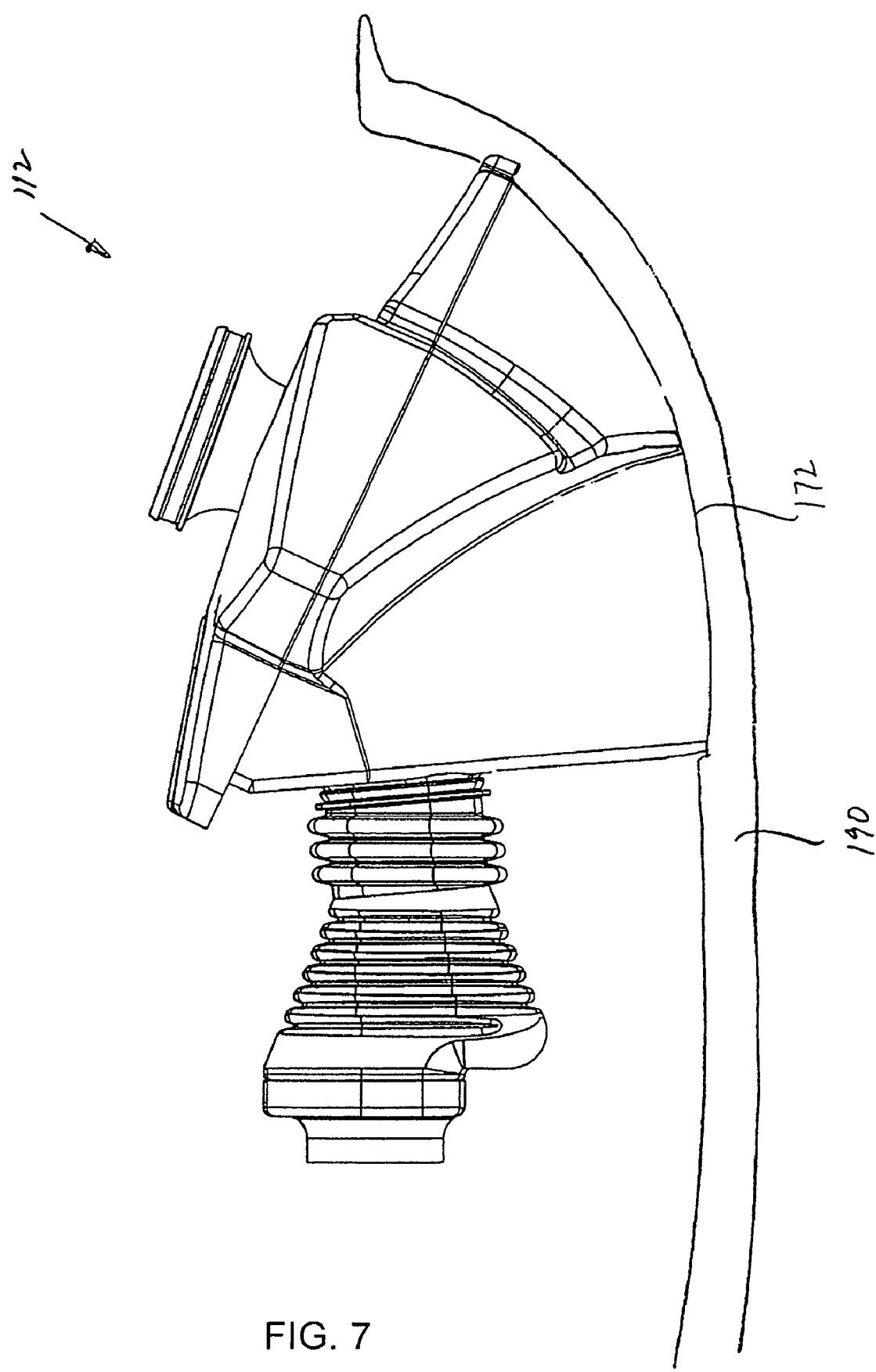
FIG. 7 is a side view of another example of an air box assembly of the present invention that utilizes a skid plate of the snowmobile as a bottom portion of the air box assembly.
Figure 8:
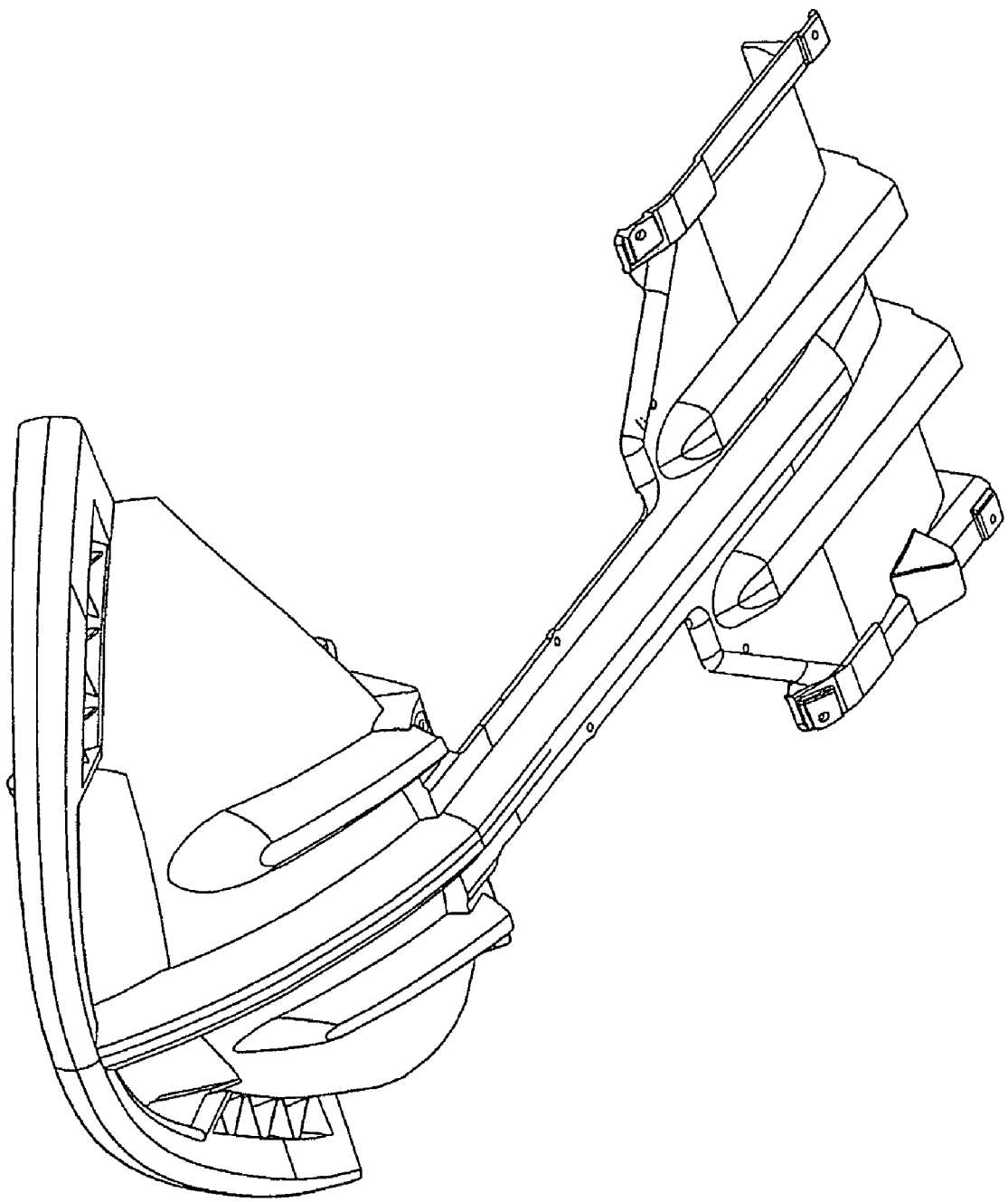
FIGS. 8 and 9 are bottom and top perspective views of a molded skid plate—nose cone—front bumper piece that is useful in an embodiment of the present invention.
Figure 9:
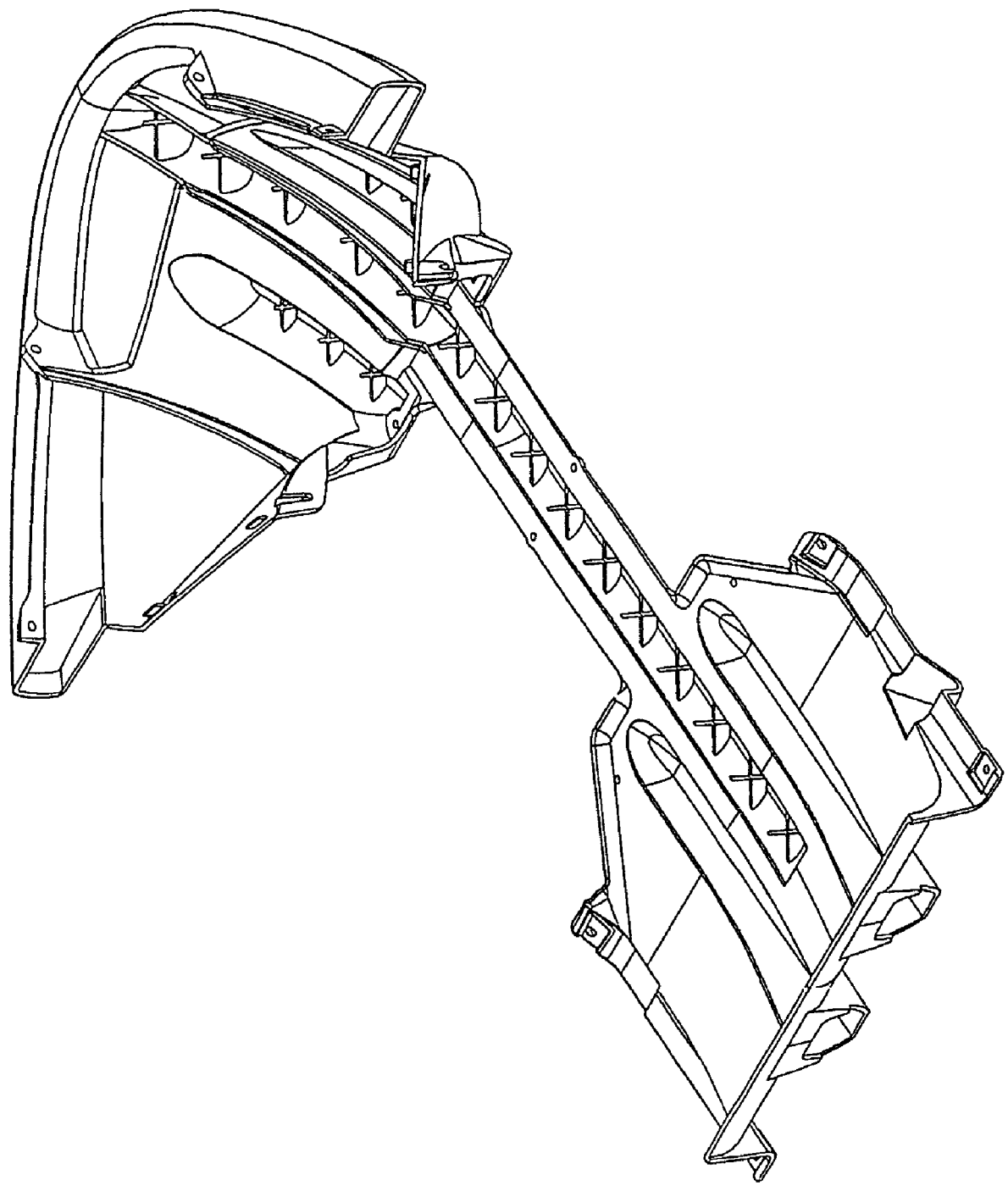

The bottom side 72 of air box assembly 12 is configured for mounting to chassis 18. In an alternative embodiment of an air box assembly 112 shown in FIG. 7, the bottom side 172 of the air box assembly 112 is capable of acting as a skid plate 190 or belly pan of the snowmobile. Such a configuration would reduce the net weight and overall cost of the air box assembly for the snowmobile. In an embodiment illustrated in FIGS. 8 and 9, the bottom side of the air box assembly is part of a one piece component that provides a skid plate, nose cone and front bumper for the snowmobile. The nose cone may be adapted for mounting of the hood of the snowmobile, for example through the use of an apertured protrusion that can accept a hinge pin. This component may be formed of a suitable plastic material such as high density polypropylene. Other polymer materials or metals can be used, or combinations of materials can be used, e.g. a polymeric shell on a metal frame piece or the use of metal for a support framework for hollow ribs of the component.

Air box assemblies 12 and 112 each are positioned frontward of engine 16 relative to front end 30 of chassis 18. With the air box assembly positioned forward on the chassis, throttle noise generated by throttle assembly 14 is dampened at a location on the snowmobile further from an operator and other passengers of the snowmobile positioned in operator position 32. Thus, the arrangement of the air box assembly frontward of the engine provided by the present invention reduces throttle noise for the snowmobile operator and passengers.

A further advantage of positioning the air box assembly frontward rather than rearward on the chassis (i.e., adjacent the fuel tank) is that there is more space available for fuel tank capacity. Increased fuel tank capacity reduces the frequency at which the fuel tank must be refilled.

A still further advantage of positioning the air box assembly frontward of the snowmobile engine is that the air box is able to draw from a source of air that is less affected by heat being generated by the engine. Typically, cooler air being fed to the engine through the throttle body assembly equates to improved engine performance. Thus, by positioning the air box assembly frontward of the engine, the source of air for the air box assembly may also be positioned more frontward on the snowmobile and removed from heat being generated by the snowmobile engine. In addition, during operation of the snowmobile snow can enter the engine compartment through openings in the hood, where it is vaporized due to the heat of the operating engine. Positioning the air box assembly frontward of the engine reduces the exposure of the air intake system to water vapor from the snow, increasing the intake of cold clean air.

Another advantage of positioning the air box assembly forward of the engine is that there is more room in the chassis for rotating the engine into a "lay down" position and moving the engine into a lower, more rearward position on the chassis than a typical engine configuration. A "lay down" engine orientation lowers the center of gravity for the snowmobile and moves the center of gravity to a more rearward position, thus promoting greater stability for the snowmobile.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A snowmobile, comprising:
   an engine having at least two throttle body assemblies with at least two inlet tubes; and
   an air silencer positioned in front of the engine relative to a front end of the snowmobile, the air silencer having an air inlet/outlet port in fluid communication with the throttle body assemblies; and
   a flexible tube having a first end and a second end, the first end having an inlet aperture secured to the air inlet/outlet port and the second end secured to the throttle body assemblies, the second end having two or more outlet apertures receiving the at least two inlet tubes of the throttle body assemblies.

2. The snowmobile of claim 1, further comprising an air source in fluid communication with a first portion of the air silencer.

3. The snowmobile of claim 1 wherein the air silencer is configured with multiple internal chambers, the chambers being capable of dampening throttle noise generated by the throttle body assemblies.

4. The snowmobile of claim 1 wherein the air silencer includes a top wall, a bottom wall, and a rear wall, the top wall having an air inlet, the bottom wall securable to a chassis of the snowmobile, and the rear wall having the air inlet/outlet port that is in fluid communication with the throttle body assemblies.

5. The snowmobile of claim 4, wherein the bottom wall is operable as a nose cone for the snowmobile.

6. The snowmobile of claim 4, wherein the bottom wall is operable as a bumper for the snowmobile.

\* \* \* \* \*

UNITED STATES PATENT AND TRADEMARK OFFICE
CERTIFICATE OF CORRECTION

| | |
|---|---|
| PATENT NO. | : 7,367,418 B2 |
| APPLICATION NO. | : 11/424793 |
| DATED | : May 6, 2008 |
| INVENTOR(S) | : Donn Eide |

Page 1 of 1

It is certified that error appears in the above-identified patent and that said Letters Patent is hereby corrected as shown below:

In Col. 4 line 30 Claim 4. Delete "iniet" insert --inlet--

Signed and Sealed this

Nineteenth Day of August, 2008

JON W. DUDAS
*Director of the United States Patent and Trademark Office*